(12) United States Patent
Reiser et al.

(10) Patent No.: US 8,226,806 B2
(45) Date of Patent: Jul. 24, 2012

(54) ELECTRODE FOR ELECTROLYSIS

(75) Inventors: Klaus Reiser, Bad Ischl (AT); Conrad Reynvaan, Bad Ischl (AT); Stefan Schneweis, Grävenwiesbach (DE)

(73) Assignee: Hoffmann & Co., Elektrokohle AG, Steeg (AT)

( * ) Notice: Subject to any disclaimer, the term of this patent is extended or adjusted under 35 U.S.C. 154(b) by 145 days.

(21) Appl. No.: 12/505,055

(22) Filed: Jul. 17, 2009

(65) Prior Publication Data

US 2010/0038238 A1 Feb. 18, 2010

(30) Foreign Application Priority Data

Jul. 17, 2008 (DE) .......... 10 2008 033 567

(51) Int. Cl.
*C25B 11/12* (2006.01)
*C25B 11/06* (2006.01)
(52) U.S. Cl. ........... 204/294; 204/290.15; 204/290.12
(58) Field of Classification Search .......... 204/294, 204/280, 290.01, 290.12, 290.15
See application file for complete search history.

(56) References Cited

U.S. PATENT DOCUMENTS

| 5,855,967 A * | 1/1999 | Kirkpatrick ........... 427/527 |
| 5,900,127 A * | 5/1999 | Iida et al. ........... 204/290.08 |
| 2007/0029190 A1 * | 2/2007 | Hosonuma et al. ........... 204/280 |

FOREIGN PATENT DOCUMENTS

| DE | 29916126 U1 | 1/2000 |
| EP | 0994074 A2 | 4/2000 |
| EP | 1640479 A1 | 3/2006 |
| EP | 1468965 B1 | 9/2006 |
| EP | 1703001 A2 | 9/2006 |

OTHER PUBLICATIONS

"European Search Report dated Sep. 21, 2009 for corresponding EP 09165675.1," 4 pgs.

* cited by examiner

*Primary Examiner* — Bruce Bell
(74) *Attorney, Agent, or Firm* — Fredrikson & Byron, P.A.

(57) ABSTRACT

The embodiments of the invention relate to an electrode for electrolysis comprising an electrode substrate and a coating of the electrode substrate with a polycrystalline diamond material, that the electrode substrate consists of a base body of carbon material and at least one contact layer of the electrode substrate carrying the coating consists of a non-metallic, electrically conductive material.

14 Claims, 1 Drawing Sheet

ELECTRODE FOR ELECTROLYSIS

CROSS REFERENCE TO RELATED APPLICATIONS

This application claims priority to German Patent Application No. 10 2008033567.3 filed Jul. 17, 2008, the teachings of which are incorporated herein by reference.

The embodiments of the present invention relate to an electrode for electrolysis comprising an electrode substrate and a coating of the electrode substrate with a polycrystalline diamond material or a diamond like carbon (DLC) material.

BACKGROUND OF THE INVENTION

It has been known to use an electrolysis process in aqueous solution systems in order to produce hydrogen, ozone, hydrogen peroxide and other oxygen compounds. In other applications it is known to use the electrolysis method or the oxygen overvoltage optionally produced during the electrolysis which makes it possible to treat aqueous solutions at a higher potential than would be required to produce the substances mentioned hereinbefore as an example in order to use oxidizing agents produced during the electrolysis for the treatment of waste water, in particular for the treatment of bacteria.

Recently diamond or diamond like carbon material has been used as material of an electrode (anode) for electrolysis used to carry out such oxidation of the aqueous solution, this diamond being applied as a coating to an electrode substrate of a metallic material. Diamond like carbon material is known to the man skilled in the art as DLC (diamond like carbon).

It is known from EP 1 468 965 B1 to apply a diamond powder to a metallic electrode substrate in order to produce a suitable electrode.

EP 0 994 074 A1 discloses a diamond electrode for electrolysis, comprising a base body which is coated with a diamond layer produced by CVD (chemical vapour deposition).

Regardless of the different type for producing a coating of the electrode substrate with polycrystalline diamond, the known electrodes have a structure in which the diamond coating is applied to a metallic electrode substrate.

The direct coating of the metallic electrode substrate with polycrystalline diamond material can result in defects in the coating during operation of the electrode used as an anode, which can lead to high local currents and a resulting thermal alternating load on the electrode. Caused by the very different coefficients of thermal expansion of diamond and metal, this can result in the formation of micro-cracks in the metal surface which leave the metal particularly exposed to the electrochemical processes taking place during electrolysis. The consequence of this is a further intensification of the formation of defects in the coating which can lead to complete destruction of the electrode so that a frequent exchange of the known diamond electrodes is necessary as a result of correspondingly reduced lifetime.

BRIEF SUMMARY OF THE INVENTION

It is therefore an object of the embodiments of the invention to provide an electrode for electrolysis which has a higher reliability during operation compared with the known electrodes and has an increased lifetime.

The electrode according to the embodiments of the invention has an electrode substrate which includes a base body of carbon material and at least one contact layer of a non-metallic electrically conductive material bearing the coating.

In the electrode according to the embodiments of the invention, instead of a metallic electrode substrate, an electrode substrate of a carbon material is used which, as a result of its type relationship to the diamond coating, has a substantially smaller difference in temperature coefficient than is the case with a metal-diamond pairing. The contact layer of the electrode substrate forming the boundary layer between the base body and the coating consists of a non-metallic material which is indeed electrically conductive but likewise does not have the unfavourable temperature coefficient of metal in relation to the temperature coefficient of the diamond.

In order to increase the conductivity it is preferred to dope the polycrystalline diamond or the DLC material with boron.

The electrode according to the embodiments of the invention accordingly has a base body which is particularly as to its conductivity and its suitability to be coated in the contact area towards the polycrystalline diamond or the DLC material comparable to a metallic electrode substrate but without the material-specific disadvantages obtained in the case of an electrode substrate of metal, which are particularly attributable to the temperature coefficients of metal.

The suitability to be coated and the adhesion to the coating can be improved and thus the risk of defects can be reduced by a reduced pore diameter, preferably in conjunction with a smoothed surface of the contact layer.

According to a preferred embodiment the contact layer is configured so that it has a roughness depth of about $R_a < 15$ μm and most preferably a maximum roughness depth of about $<15$ μm. Thus there is formed an electrode substrate which, as a result of the carbon material on the one hand, is distinguished by a good electrical conductivity with a relatively low temperature coefficient compared to the metal and on the other hand, due to the surface of the contact layer being configured with low roughness depth, avoids the formation of pores in the contact area for the coating with polycrystalline diamond material or DLC so that as a result, precisely the effects which, in the known electrodes, lead to the formation of defects in the coating and cracks in the electrode substrate, are reduced and may even be avoided.

In a preferred embodiment of the electrode, the electrode substrate is formed from a base body of glassy carbon with a contact layer formed by a finished surface of the base body. In this embodiment, the base body and the contact layer accordingly consist of the same material, wherein the properties essential for the contact layer are achieved by a surface treatment of the base body. As a result, in such an embodiment the coating with polycrystalline diamond material or DLC can be carried out directly on the base body itself without the contact layer needing to be produced by An intermediate layer formed from another material.

According to a further advantageous embodiment, the contact layer is formed from a coating of a ceramic material, in particular a carbide, preferably silicon carbide, formed on the base body. In this case, the coating can take place by a subsequent application of a silicon carbide layer to the base body of the electrode substrate or it can be accomplished by a conversion of the base body formed from a carbon material in an outer region in such a manner that silicon carbide is formed as a result of this conversion in the outer area of the base body.

In order to achieve the desired electrical conductivity of the coating, the silicon carbide can be doped with a semiconductor such as, for example, boron.

In experiments it has also been found that doping with nitrogen can also lead to the formation of the desired electrical conductivity of the coating.

It has been found to be particularly advantageous with regard to the lifetime and performance of the electrode if the base body of the electrode substrate consists of a graphite material having a density (raw density) less than about 2.1 g/cm³. Particularly good results could be achieved by using a graphite material for the electrode substrate having a density between about 1.6 and about 1.85 g/cm³.

With regard to the layer thickness of the coating with silicon carbide, a layer thickness of about <150 μm has been found to be advantageous. A layer thickness between about 0.2 μm and about 150 μm is particularly advantageous.

Preferred embodiments of the electrode are explained in detail hereinafter with reference to the drawings.

DETAILED DESCRIPTION OF THE INVENTION

Figure 1:
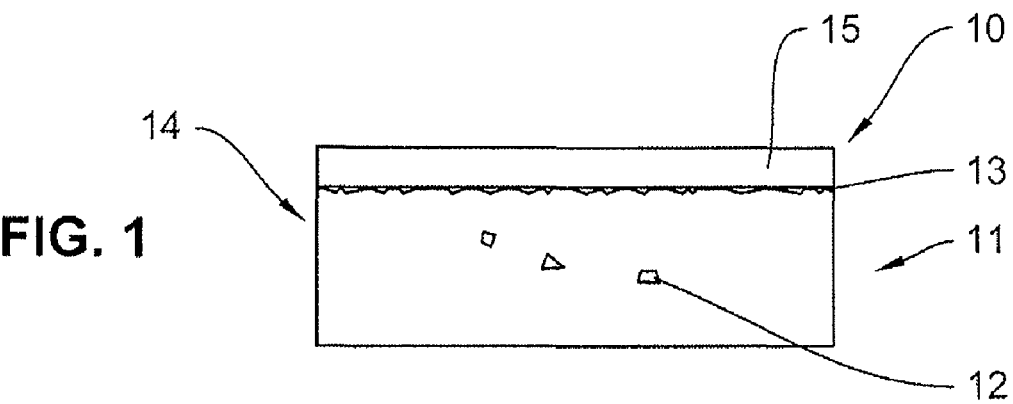
FIG. 1 shows an electrode according to a first embodiment.

FIG. 1 shows an electrode 10 comprising an electrode substrate 11 which is formed from a glassy carbon having a defined porosity. In a preferred embodiment, the glassy carbon of the electrode substrate 11 has pores 12 with a maximum pore size or a maximum pore diameter of about 12 μm. In the electrode 10 shown in FIG. 1 a contact layer 13 is formed between a base body 14 of the electrode substrate 11 and a coating 15 from a polished surface of the electrode substrate 11 in such a manner that as a consequence of the polishing process, pores are smoothed in the area of the surface or at least partially filled by a carbon abrasion produced during the polishing process. As a result, a surface roughness $R_a$ of the surface of the electrode substrate 11 is obtained, which is smaller than the size of the pores 12.

Figure 2:
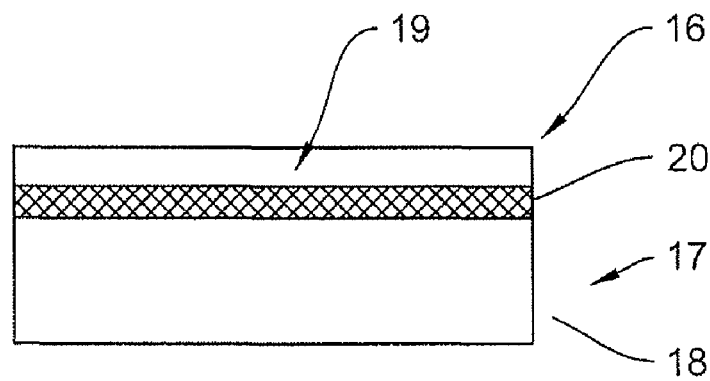
FIG. 2 shows an electrode according to a second embodiment.

FIG. 2 shows an electrode 16 comprising an electrode substrate 17 with a base body 18 of a carbon material, in particular graphite, wherein the base body has a density of about 1.6 g/cm³. A contact layer 20 is located between the base body 18 and a coating 19 of polycrystalline diamond material. The contact layer 20 consists of a silicon carbide doped with boron.

Figure 3:
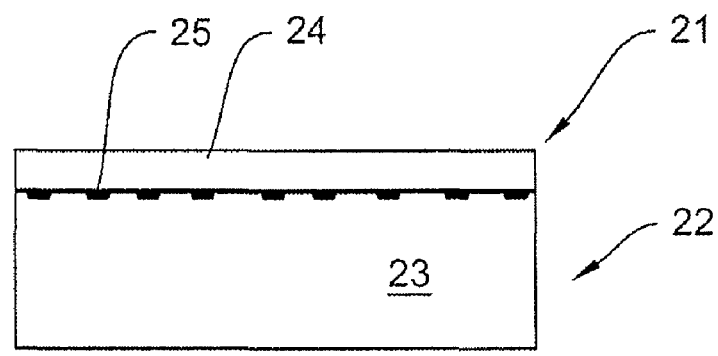
FIG. 3 shows an electrode according to a third embodiment.

FIG. 3 shows an electrode 21 comprising an electrode substrate 22 with a base body 23, which adjoins a coating 24 of polycrystalline diamond material. In the case of the electrode 21, a contact layer 25 is formed from a surface area of the base body 23 facing the coating 24, which comprises an impregnation with a ceramic material such as, for example, silicon carbide. As a result of the impregnation, the contact layer 25 has a reduced porosity compared to the porosity of the base body 23 and therefore also reduced surface roughness $R_a$.

What is claimed is:

1. An electrode for electrolysis comprising an electrode substrate comprising:
    a base body of carbon material and at least one contact layer of a non-metallic, electrically conductive material; and
    a coating on the electrode substrate, the coating having a polycrystalline diamond material, disposed over the substrate,
    wherein the contact layer has a reduced pore diameter compared to the electrode substrate and the contact layer is formed from a coating of a carbide applied to the base body wherein the carbide is doped with nitrogen.

2. The electrode according to claim 1 wherein the contact layer has a smoothed surface.

3. The electrode according to claim 1 wherein the contact layer has a surface having a roughness depth of about $R_a$<μm.

4. The electrode according to claim 1 wherein the electrode substrate is formed from a base body of glassy carbon with a contact layer formed by a finished surface of the base body.

5. The electrode according to claim 1, wherein the contact layer is formed from silicon carbide.

6. The electrode according to claim 5 wherein the silicon carbide is doped with a semiconductor.

7. The electrode according to claim 6 wherein the silicon carbide is doped with boron.

8. The electrode according to claim 6 wherein the silicon carbide is doped with nitrogen.

9. The electrode according to claim 1 wherein the carbide is doped with a semiconductor.

10. The electrode according to claim 9 wherein the carbide is doped with boron.

11. The electrode according to claim 1 wherein the carbon material of the base body consists of graphite having a density of about <2.1 g/cm³.

12. The electrode according to claim 11 wherein the carbon material has a density between about 1.6 and about 1.85 g/cm³.

13. The electrode according to claim 1 wherein the layer thickness of the contact layer is about <150 μm.

14. The electrode according to claim 13 wherein the layer thickness of the contact layer is between about 0.2 μm and about 100 μm.

* * * * *